(12) United States Patent
Okuyama et al.

(10) Patent No.: US 11,045,992 B2
(45) Date of Patent: *Jun. 29, 2021

(54) LIQUID BLOW MOLDING METHOD

(71) Applicant: YOSHINO KOGYOSHO CO., LTD., Tokyo (JP)

(72) Inventors: Yuichi Okuyama, Tokyo (JP); Kenichi Suyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 16/326,653

(22) PCT Filed: Jun. 7, 2017

(86) PCT No.: PCT/JP2017/021176
§ 371 (c)(1),
(2) Date: Feb. 19, 2019

(87) PCT Pub. No.: WO2018/042807
PCT Pub. Date: Mar. 8, 2018

(65) Prior Publication Data
US 2020/0247030 A1      Aug. 6, 2020

(30) Foreign Application Priority Data
Aug. 31, 2016    (JP) .............................. JP2016-170137

(51) Int. Cl.
*B29C 49/46*      (2006.01)
*B29K 23/00*      (2006.01)
(Continued)

(52) U.S. Cl.
CPC ........ *B29C 49/46* (2013.01); *B29C 2049/465* (2013.01); *B29K 2023/12* (2013.01); *B29K 2067/003* (2013.01); *B29L 2031/7158* (2013.01)

(58) Field of Classification Search
CPC . B29C 49/46; B29C 2049/465; B29C 49/783; B29C 49/06; B29C 2049/4664;
(Continued)

(56) References Cited

U.S. PATENT DOCUMENTS 10,857,720 B2 *  12/2020  Morikami ............... B29C 49/46
2012/0266567 A1  10/2012  Haesendonckx et al.
(Continued)

FOREIGN PATENT DOCUMENTS

JP       2004-093485 A      3/2004
JP       2013-208834 A     10/2013
(Continued)

OTHER PUBLICATIONS

Jul. 11, 2017 International Search Report issued in International Patent Application No. PCT/JP2017/021176.
(Continued)

*Primary Examiner* — Jacob T Minskey
*Assistant Examiner* — S. Behrooz Ghorishi
(74) *Attorney, Agent, or Firm* — Oliff PLC

(57) ABSTRACT

A liquid blow molding method includes: a preliminary pressurizing step of operating a pressure feeding source to preliminary pressurize a liquid between the pressure feeding source and a blow nozzle; an operating condition setting step of setting an operating condition of the pressure feeding source on the basis of data acquired by the preliminary pressurizing step; a blow molding step of liquid blow molding a preform into a container of a predetermined shape; and a suck-back step of operating the pressure feeding source in a reverse direction on the operating condition set in the operating condition setting step to suck back the liquid from inside of the container molded into a predetermined shape in the blow molding step toward inside of the blow nozzle.

6 Claims, 10 Drawing Sheets

(51) Int. Cl.
*B29K 67/00* (2006.01)
*B29L 31/00* (2006.01)

(58) Field of Classification Search
CPC ......... B29C 49/12; B29C 49/28; B29C 49/78; B29C 2049/1238; B29C 2049/1271; B29C 2949/78563; B29C 2949/78882; B29C 49/1223; B29K 2023/12; B29K 2067/003; B29K 2105/258; B29L 2031/7158
See application file for complete search history.

(56) References Cited

U.S. PATENT DOCUMENTS

| | | |
|---|---|---|
| 2015/0314518 A1 | 11/2015 | Gillet |
| 2017/0008216 A1* | 1/2017 | Suyama ................ B29C 49/783 |
| 2019/0184623 A1* | 6/2019 | Morikami ............... B29C 49/58 |

FOREIGN PATENT DOCUMENTS

| | | | |
|---|---|---|---|
| JP | 2014-069441 A | 4/2014 | |
| WO | 2014/049930 A1 | 4/2014 | |
| WO | 2015/114705 A1 | 8/2015 | |
| WO | WO-2015114705 A1 * | 8/2015 | ............. B29C 49/06 |
| WO | 2015/136369 A2 | 9/2015 | |
| WO | 2015/197846 A1 | 12/2015 | |
| WO | 2016/017153 A1 | 2/2016 | |

OTHER PUBLICATIONS

Jun. 1, 2020 Office Action issued in Chinese Patent Application No. 201780051607.4.
Apr. 3, 2020 Extended Search Report issued in European Patent Application No. 17845818.8.

* cited by examiner

LIQUID BLOW MOLDING METHOD

TECHNICAL FIELD

The present disclosure relates to a liquid blow molding method in which a pressurized liquid is fed from a pressure feeding source into a bottomed tubular preform through a blow nozzle to mold the preform into a liquid container of a predetermined shape containing a content liquid.

BACKGROUND

Synthetic resin containers, representatives of which are polypropylene (PP) or polyethylene terephthalate (PET) bottles, are used in applications in which various liquids such as beverages, cosmetics, chemicals, detergents, shampoos, rinses or the like are contained as a content liquid.

In general, such a container is manufactured by blow molding a preform formed into a bottomed tubular shape by the above described thermoplastic synthetic resin material. Further, as the blow molding for molding a preform into a container, a liquid blow molding in which, as a pressurized medium fed into the preform, a pressurized liquid is used instead of a pressurized air is known.

For example, Patent Literatures 1 and 2 (PTL 1 and PTL 2) disclose a liquid blow molding method in which a preform previously heated to a temperature at which a stretching effect is expressed is placed into a mold for blow molding, the preform is stretched by a stretching rod in the longitudinal direction while a liquid pressurized to a predetermined pressure is fed from a pressure feeding source into the preform through a blow nozzle, thus the preform is molded into a container of a predetermined shape conforming to a cavity of the mold. According to the above described liquid blow molding method, as a liquid fed into the preform, a content liquid such as beverage to be contained finally in a container as a product is used, and the preform can be molded into a liquid container of a predetermined shape containing a content liquid. Accordingly, a step of filling a content liquid into a container after molding is omitted, and the production process and a production line (apparatus) can be simplified.

CITATION LIST

Patent Literature

PTL 1: JP2013-208834A
PTL 2: JP2014-069441A

SUMMARY

Technical Problem

In the liquid blow molding, a preform is molded into an expanded state by a pressure fed into the preform, and a container after molding is fully filled with a liquid. Thus, as described in PTL 2, in some cases, after the liquid blow molding, "suck-back" is performed in which a pressure feeding source is operated in the reverse direction to suck back a predetermined amount of liquid from the inside of the container into a blow nozzle to create a predetermined amount of headspace (a space filled with no liquid) in the container after molding.

However, in the liquid blow molding, a liquid is fed into the preform while entraining the air existing in the preform. Thus, when a liquid is sucked back from inside of a container after molding, a liquid containing a lot of air bubbles is taken into a blow nozzle. In particular, when a liquid with a relatively high viscosity such as shampoo and rinse is used as a pressurized medium, the air mixed into the liquid does not come out smoothly, and as a result of this, a lot of air bubbles remain in the blow nozzle when the liquid blow molding is repeated. Thus, in the suck-back for sucking back a predetermined amount of liquid, an amount to be sucked back varies depending on the amount of air bubbles existing in a nozzle.

The present disclosure is to solve the above problem, and the present disclosure is to provide a liquid blow molding method in which the amount of liquid contained in a container after molding can be constant regardless of the amount of air bubbles mixed in the liquid.

Solution to Problem

The disclosed liquid blow molding method is a liquid blow molding method of feeding a pressurized liquid from a pressure feeding source into a bottomed tubular preform through a blow nozzle to mold the preform into a liquid container of a predetermined shape containing a content liquid. The method includes: a preliminary pressurizing step of operating the pressure feeding source with the blow nozzle closed with a sealing body to preliminary pressurize a liquid between the pressure feeding source and the blow nozzle; an operating condition setting step of setting an operating condition of the pressure feeding source on the basis of data acquired by the preliminary pressurizing step; a blow molding step of operating the pressure feeding source with the blow nozzle opened to liquid blow mold the preform into a container of a predetermined shape; and a suck-back step of operating the pressure feeding source in the reverse direction with the blow nozzle opened on the operating condition set in the operating condition setting step to suck back a liquid from inside of the container molded into a predetermined shape in the blow molding step toward inside of the blow nozzle.

In the disclosed liquid blow molding method of the above described configuration, preferably, in the blow molding step, the pressure feeding source is operated on the operating condition set in the operating condition setting step to liquid blow mold the preform into a container of a predetermined shape.

In the disclosed liquid blow molding method of the above described configuration, preferably, the pressure feeding source is a plunger pump including a cylinder and a plunger axially displaceable in the cylinder, and the operating condition of the pressure feeding source set in the operating condition setting step is an operation stroke of the plunger.

In the disclosed liquid blow molding method of the above described configuration, preferably, in the operating condition setting step, the operating condition of the pressure feeding source is set on the basis of a difference between a stroke of the plunger until a pressure of a liquid between the plunger pump and the blow nozzle in the preliminary pressurizing step reaches a predetermined pressure and a reference stroke.

Advantageous Effect

According to the present disclosure, a liquid blow molding method that allows the amount of liquid contained in a container after molding to be constant regardless of the amount of air bubbles mixed in the liquid can be provided.

DETAILED DESCRIPTION

The present disclosure will be illustrated in more detail below with reference to the drawings.

The disclosed liquid blow molding method is a liquid blow molding method of feeding a pressurized liquid from a pressure feeding source into a bottomed tubular preform through a blow nozzle to mold the preform into a liquid container of a predetermined shape containing a content liquid. The method includes: a preliminary pressurizing step of operating the pressure feeding source with the blow nozzle closed with a sealing body to preliminary pressurize a liquid between the pressure feeding source and the blow nozzle; an operating condition setting step of setting an operating condition of the pressure feeding source on the basis of data acquired by the preliminary pressurizing step; a blow molding step of operating the pressure feeding source with the blow nozzle opened to liquid blow mold the preform into a container of a predetermined shape; and a suck-back step of operating the pressure feeding source in the reverse direction with the blow nozzle opened on the operating condition set in the operating condition setting step to suck back a liquid from inside of the container molded into a predetermined shape in the blow molding step toward inside of the blow nozzle. The disclosed liquid blow molding method described above can be said to be a method of manufacturing a liquid container containing a content liquid from a preform, and the method can be performed by using a liquid blow molding apparatus 1 configured as illustrated in FIG. 1, for example.

Figure 1:
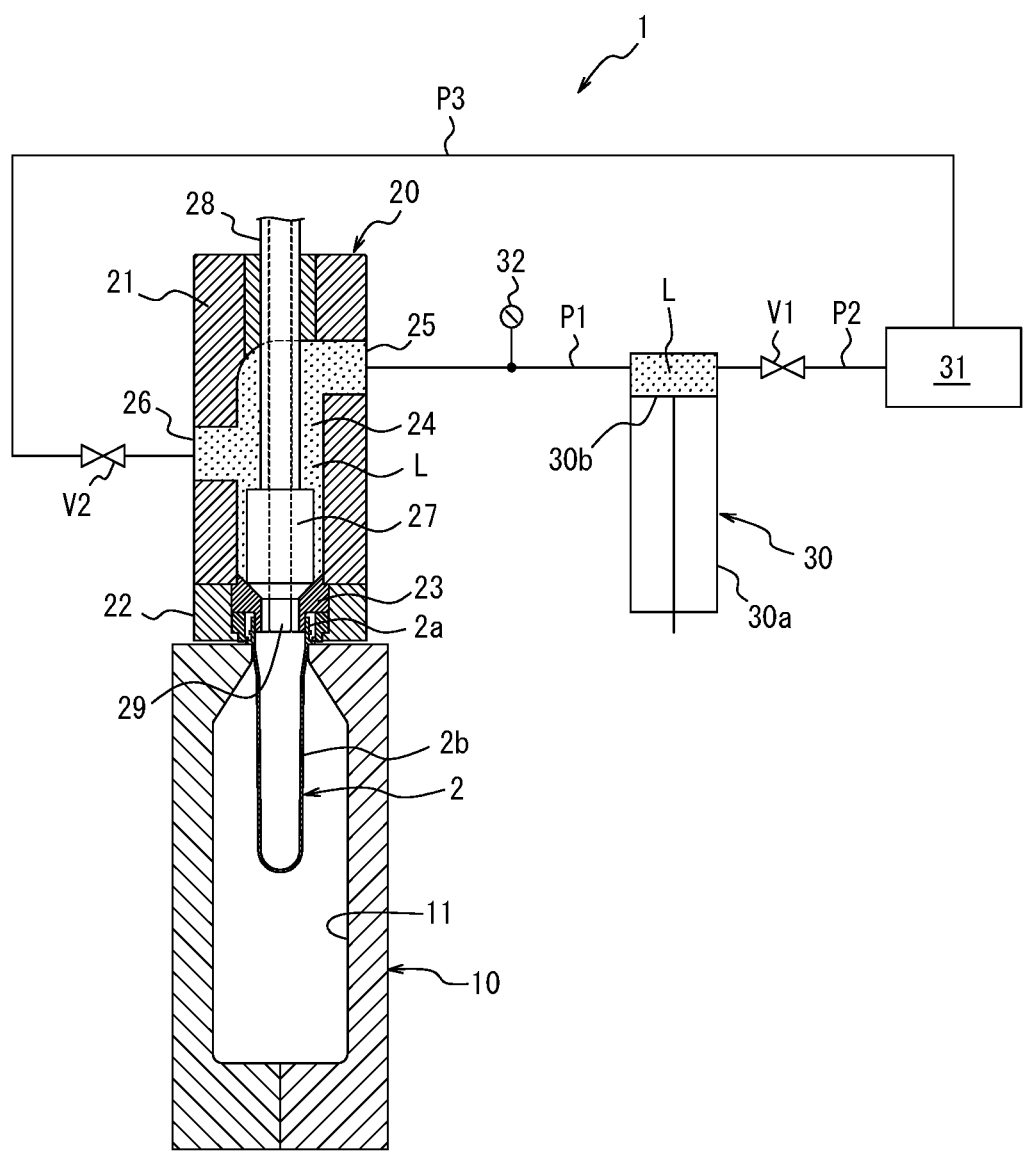
FIG. 1 is a diagram illustrating an example of a liquid blow molding apparatus used for a liquid blow molding method of an embodiment of the present disclosure.

The liquid blow molding apparatus 1 illustrated in FIG. 1 is used for liquid blow molding a preform 2 to mold the preform 2 into a liquid container of a predetermined shape containing a content liquid.

Here, the liquid blow molding is a blow molding in which, as a pressurized medium (a pressurized fluid) fed to the preform 2, a pressurized liquid L is used instead of a pressurized air used for air blow molding.

As a liquid L fed to the preform 2 (a content liquid contained in a container after molding), a variety of liquids such as, for example, beverages, cosmetics, chemicals, shampoos, rinses can be used.

As the preform 2, a bottomed tubular preform made of thermoplastic synthetic resin material such as, for example, polypropylene (PP) or polyethylene terephthalate (PET) can be used, the bottomed tubular preform including a cylindrical mouth 2a, which is an opened end, and a cylindrical barrel 2b continuous with the mouth 2a and having a closed lower end. The preform 2 is not limited to those having the above described shape, and may have a variety of shapes corresponding to the shape or the like of a container after molding as long as it has a bottomed tubular shape.

Although not illustrated in detail, on the outer wall of the mouth 2a is provided with an engaging protrusion configured to attach a closing cap (not illustrated) to the mouth 2a of the container after molding by capping (undercut engagement). Instead of the engagement protrusion, a male thread may be provided on the outer wall of the mouth 2a such that the closing cap can be screwed onto the mouth 2a.

The liquid blow molding apparatus 1 has a mold 10 for blow molding. The mold 10 has a cavity 11 of a shape corresponding to a final shape of a container such as a bottle shape, for example. The cavity 11 is opened upward on the upper surface of the mold 10. The preform 2 is placed into the mold 10 with its barrel 2b disposed in the cavity 11 of the mold 10 and its mouth 2a protruded upward from the mold 10.

The mold 10 can be opened right and left, and when it is opened right and left after the preform 2 is molded into a container, the container can be ejected from the mold 10.

A nozzle unit 20 configured to feed a liquid L into the preform 2 is provided on top of the mold 10. The nozzle unit 20 has a body block 21, and the body block 21 is vertically displaceable relative to the mold 10. A support block 22 is provided on the lower end of the body block 21, and a blow nozzle 23 is attached to the lower end of the body block 21 while being supported by the support block 22. The blow nozzle 23 is formed into a substantially cylindrical shape, and is engaged, from the upper side, with the mouth 2a of the preform 2 placed into the mold 10 when the body block 21 goes down to the stroke end on the lower side.

A feed path 24 extending in the vertical direction is provided in the body block 21. The feed path 24 is used for feeding the liquid L to the blow nozzle 23, and communicates with the blow nozzle 23 at the lower end thereof. Further, the body block 21 is provided with a feed port 25 communicating with the upper end of the feed path 24 and a discharge port 26 communicating with the middle portion of the feed path 24.

A sealing body 27 configured to open/close the blow nozzle 23 is disposed in the feed path 24. The sealing body 27 is provided on the lower end of a shaft body 28 provided vertically displaceable in the nozzle unit 20, and is vertically displaceable in the feed path 24. The sealing body 27 is formed into a columnar shape, and when it is displaced to the close position, which is a stroke end position on the lower side, it comes in abutment with the top surface of the blow nozzle 23 on its lower end surface, and thus closes the blow nozzle 23. On the other hand, when the sealing body 27 is displaced upward relative to the nozzle unit 20 from the close position and comes to an open position, the blow nozzle 23 is opened and communicated with the feed path 24. It is to be noted that the sealing body 27 may have a variety of configurations as long as it can open/close the blow nozzle 23.

As illustrated, the liquid blow molding apparatus 1 may include a stretching rod 29. The stretching rod 29 is inserted in the shaft center of the shaft body 28 such that it is vertically displaceable relative to the shaft body 28, passes through the shaft center of the sealing body 27 and is extendable from the lower end of the sealing body 27. The stretching rod 29 is driven by a drive source not illustrated and is displaced downward. Then as a result it can stretch the preform 2 in the axial direction. In this manner, when the stretching rod 29 is provided, the liquid blow molding apparatus 1 can perform biaxial stretch blow molding in which the preform 2 is axially stretched by the stretching rod 29 while being radially stretched by the pressurized liquid L fed from the mouth 2a. It is to be noted that the liquid blow molding apparatus 1 may not include the stretching rod 29.

The feed port 25 is connected with a plunger pump 30 as a pressure feeding source through a connection path P1. The plunger pump 30 includes a cylinder 30a and a plunger 30b axially displaceable in the cylinder 30a. Although the detail is not illustrated, the plunger 30b is driven by a drive source such as a servo motor or the like, and can be displaced, in the cylinder 30a, in the axial direction of the cylinder 30a. The operation of the plunger pump 30, that is, the plunger 30b, is controlled by a position control by which the plunger 30b is displaced between the original position and the end position at a predetermined velocity.

The plunger pump 30 is connected with a feed tank 31. The feed tank 31 can be configured to contain the liquid L and to heat the liquid L to a predetermined temperature and keep it at the temperature. A connection path P2 connecting the plunger pump 30 with the feed tank 31 is provided with an opening/closing valve V1, and thereby the connection path P2 can be opened/closed.

The connection path P1 is provided with a pressure gauge 32. The pressure gauge 32 can measure the pressure of the liquid L between the blow nozzle 23 and the plunger pump 30. In other words, the pressure gauge 32 can measure the filling pressure of the liquid L fed from the plunger pump into the preform 2 during the liquid blow molding.

The discharge port 26 is connected to the feed tank 31 through a connection path P3. In other words, the feed path 24 can communicate with the feed tank 31 through the discharge port 26 and the connection path P3. The connection path P3 is provided with an opening/closing valve V2, and thereby the connection path P3 can be opened/closed.

The plunger pump 30 can feed the liquid L pressurized to a predetermined pressure into the preform 2 through the connection path P1, the feed port 25, the feed path 24 and the blow nozzle 23 when it is operated in the positive direction (the pressurized direction) with the sealing body 27 being at an open position, the blow nozzle 23 opened and the opening/closing valves V1 and V2 closed. Further, the plunger pump 30 can suck back the liquid L from the container after molding when it is operated in the reverse direction (the sucking direction) with the sealing body 27 being at an open position, the blow nozzle 23 opened and the opening/closing valves V1 and V2 remaining closed. Moreover, the plunger pump 30 can suck the liquid L contained in the feed tank 31 into the cylinder 30a to replenish the liquid L into the plunger pump 30 when it is operated in the reverse direction (the sucking direction) with the blow nozzle 23 sealed by the sealing body 27, the opening/closing valve V2 closed and the opening/closing valve V1 opened. Furthermore, the plunger pump 30 can preliminarily pressurize the liquid L between the blow nozzle 23 and the plunger pump 30 when it is operated in the positive direction with the blow nozzle 23 closed with the sealing body 27 and both of the opening/closing valves V1 and V2 closed.

Operations of the nozzle unit 20, the sealing body 27, the stretching rod 29, the plunger pump 30, the opening/closing valve V1, the opening/closing valve V2 or the like are integrally controlled by a control device not illustrated. This control can be performed with reference to the values measured by the pressure gauge 32. Preferably, the opening/closing valves V1 and V2 are configured as solenoid valves that can be controlled by a control device.

Subsequently a method of molding a liquid container C of a predetermined shape containing a content liquid from the bottomed tubular preform 2 by using the liquid blow molding apparatus 1 configured in the above described manner (the disclosed liquid blow molding method) will be described.

First, the preform 2 previously heated, by a heating means (not illustrated) such as a heater or the like, to a predetermined temperature (e.g. from 80° C. to 150° C.) at which a stretching effect can be expressed is placed into the mold 10 for blow molding and the mold is closed.

When the preform 2 is placed into the mold 10, subsequently the nozzle unit 20 is displaced down toward the mold 10, and the blow nozzle 23 connected with the plunger pump 30 through the feed path 24 is engaged with the mouth 2a of the preform 2. FIG. 1 illustrates a state where the blow nozzle 23 is engaged with the mouth 2a of the preform 2. It is to be noted that, in the state where the blow nozzle 23 is engaged with the mouth 2a of the preform 2, the sealing body 27 and the opening/closing valves V1 and V2 are all closed, and the stretching rod 29 is held at the original position where it does not protrude downward from the blow nozzle 23.

Figure 2:
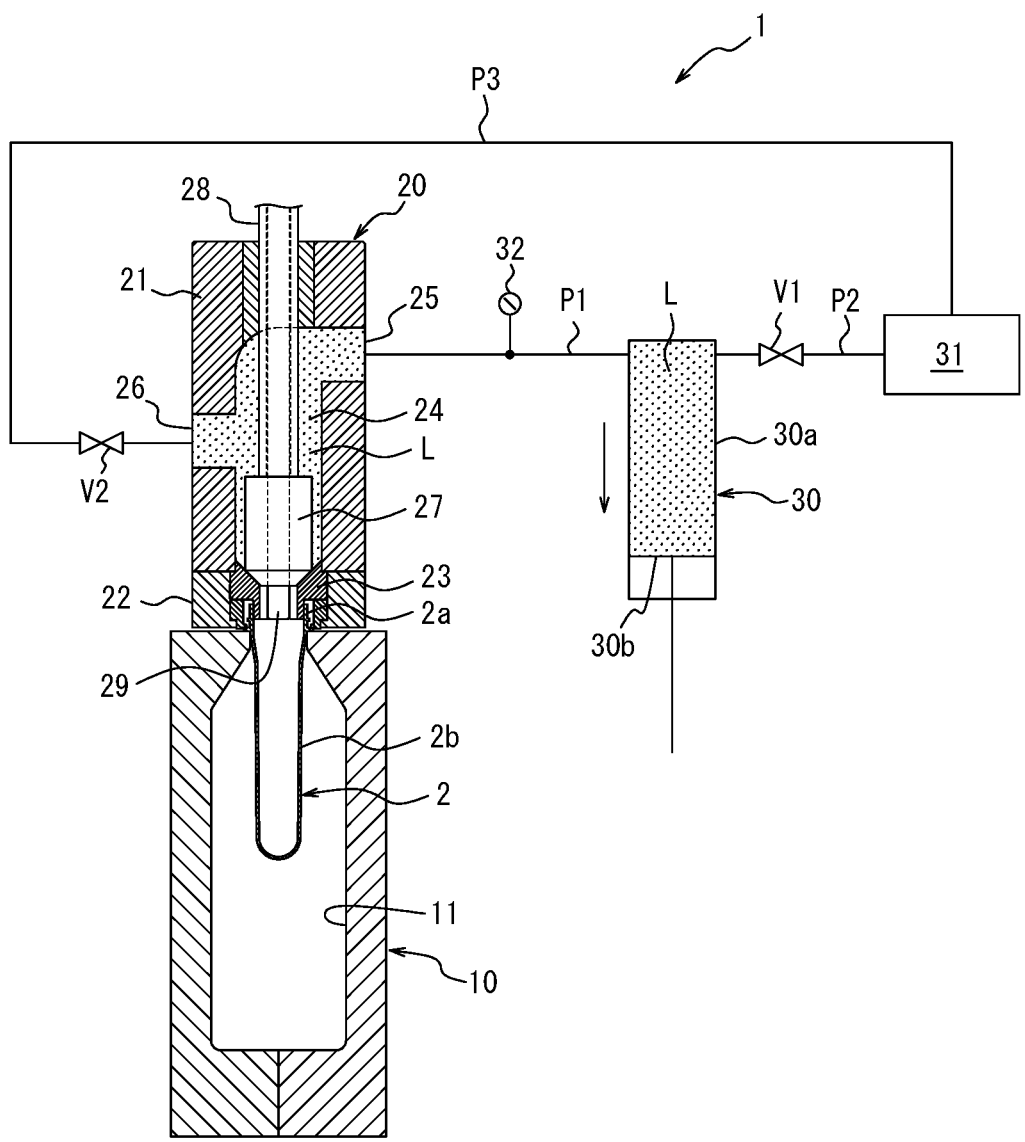
FIG. 2 is a diagram illustrating the liquid blow molding apparatus with a plunger pump filled with a liquid.

Subsequently, as illustrated in FIG. 2, the opening/closing valve V1 is opened with the sealing body 27 and the opening/closing valve V2 closed, and in this state the plunger pump 30 is operated in the reverse direction (the sucking direction) such that the liquid L contained in the feed tank 31 is sucked into the cylinder 30a of the plunger pump 30. The amount of liquid L sucked by the plunger pump 30 is appropriately set corresponding to the capacity of the liquid container C after molding.

Figure 3:
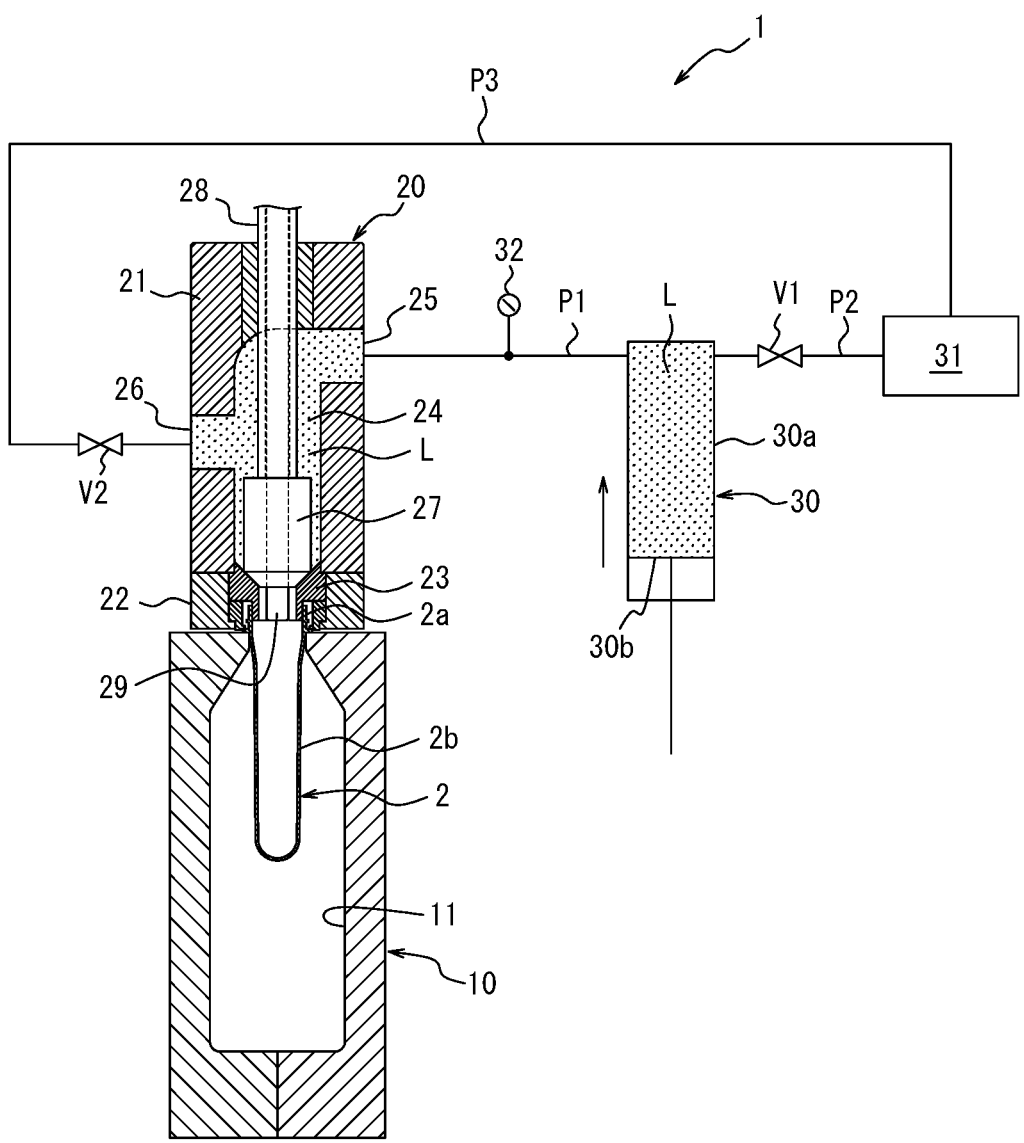
FIG. 3 is a diagram illustrating the liquid blow molding apparatus during a preliminary pressurizing step.

When a predetermined amount of liquid L is sucked into the cylinder 30a of the plunger pump 30, subsequently the preliminary pressurizing step is performed. In the preliminary pressurizing step, as illustrated in FIG. 3, with all of the sealing body 27 and the opening/closing valves V1 and V2 closed, the plunger pump 30 is operated in the positive direction (the pressurizing direction), and the liquid L between the plunger pump 30 and the blow nozzle 23, that is, the liquid L in the feed path 24, the feed port 25 and the connection path P1 is preliminarily pressurized. In other words, the plunger pump 30 is operated in the positive direction with the blow nozzle 23 closed by the sealing body 27 so as to preliminarily pressurize the liquid L between the plunger pump 30 and the blow nozzle 23 (the liquid L in the feed path 24 and the connection path P1).

In the preliminary pressurizing step, when only a small amount of air bubbles is mixed in the liquid L between the plunger pump 30 and the blow nozzle 23, the plunger 30b can be displaced only slightly. However, when a certain amount of air bubbles is mixed in the liquid L, the plunger 30b is displaced more by an amount of compression by the air bubbles, and as a result the pressure of the liquid L detected by the pressure gauge 32 becomes lower than a specified pressure. Therefore, an amount of air bubbles mixed in the liquid L between the plunger pump 30 and the blow nozzle 23 can be estimated on the basis of the data of an amount of displacement of the plunger 30b and a change in the pressure of the liquid L between the plunger pump 30 and the blow nozzle 23 acquired in the preliminary pressurizing step.

In this embodiment, as described later, an amount of air bubbles mixed in the liquid L between the plunger pump 30 and the blow nozzle 23 is estimated on the basis of the difference between the stroke of the plunger 30b until the pressure of the liquid L between the plunger pump 30 and the blow nozzle 23 reaches a predetermined pressure and a reference stroke.

Here, a reference stroke can be set as a stroke of the plunger 30b in the preliminary pressurizing step that is performed for the first time after the liquid blow molding apparatus 1 is made in a usable state by filling the feed path 24 or the like with the liquid L and by finishing a work of venting the air from the liquid L, for example. Here, "the usable state" of the liquid blow molding apparatus 1 is a state where, when the liquid container C is molded by performing the blow molding step and the suck-back step without the operating condition being fine adjusted by the operating condition setting step, the liquid container C can be molded into a container having a capacity that is within the allowable range with respect to a specified value. If the liquid blow molding apparatus 1 is in the usable state and is not yet subjected to the blow molding step, only a small amount of air bubbles is mixed in the liquid L between the plunger pump 30 and the blow nozzle 23, and thus the reference stroke is a value close to 0 (zero). It is to be noted that, the reference stroke is not limited to be set as a stroke of the plunger 30b in the preliminary pressurizing step performed for the first time after the liquid blow molding apparatus 1 is made in a usable state, and it may be set also as a stroke of the plunger 30b in the preliminary pressurizing step performed for the second time or later, or as a stroke of the plunger 30b previously set by a preliminary experiment or the like.

Figure 4:
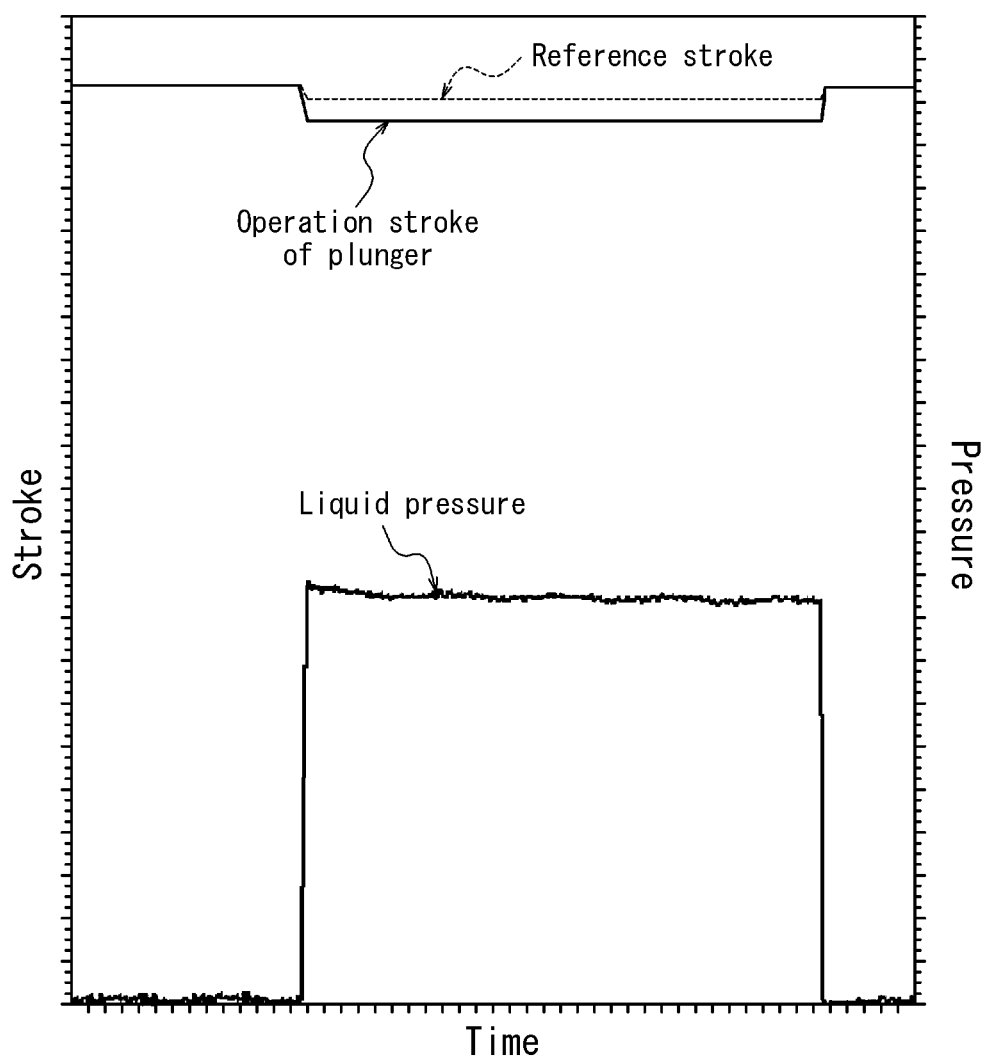
FIG. 4 is a characteristic diagram illustrating an example of a relationship between an operation stroke of a plunger in the preliminary pressurizing step and a reference stroke.

FIG. 4 illustrates an example of a relationship between the operation stroke of the plunger 30b in the preliminary pressurizing step when the blow molding step for the second time or later is performed and the reference stroke. As illustrated in FIG. 4, when the plunger 30b is operated until the pressure of the liquid L reaches a predetermined pressure in a state where only a small amount of air bubbles is mixed in the liquid L between the plunger pump 30 and the blow nozzle 23, the operation stroke of the plunger 30b, that is, the reference stroke, becomes a small value close to 0 (zero). On the other hand, in a state where a certain amount of air bubbles is mixed in the liquid L between the plunger pump 30 and the blow nozzle 23 after the blow molding step, when the plunger 30b is operated until the pressure of the liquid L reaches a predetermined pressure, the operation stroke of the plunger 30b becomes larger than the reference stroke. Therefore, in the preliminary pressurizing step in which a blow molding step for the second time or later is performed, the plunger 30b is operated until the pressure of the liquid L reaches a predetermined pressure, and an amount of air bubbles mixed in the liquid L between the plunger pump 30 and the blow nozzle 23 can be estimated on the basis of the difference between the operation stroke and the reference stroke.

It is to be noted that, in the blow molding step described later, if the sealing body 27 is opened while the pressure of the liquid L between the plunger pump 30 and the blow nozzle 23 is kept high, the liquid L under increased pressures is fed into the preform 2 all at once, and the behavior of the liquid L in the preform 2 is disturbed at an early stage of feeding of the liquid L into the preform 2. As a result of this, misalignment, rupture and unequal thickness may occur in a liquid container C after molding, and moldability thereof may be degraded. Thus, as illustrated in FIG. 4, after the preliminary pressurizing step is performed, the plunger 30b is retracted to its original position to cancel pressurization of the liquid L by the plunger pump 30 once. As a result of this, the sealing body 27 is opened in the blow molding step and disturbance of the behavior of the liquid L in the preform 2 at an early stage of feeding of the liquid L into the preform 2 is suppressed, and the moldability of the liquid container C can be improved.

When the preliminary pressurizing step is completed, subsequently the operating condition setting step is performed. In the operating condition setting step, operating condition of the plunger pump 30 is set on the basis of the data acquired in the preliminary pressurizing step. Here, the operating condition of the plunger pump 30 set in the operating condition setting step is an operation stroke of the plunger 30b toward the reverse direction (sucking direction) when the suck-back step of sucking back the liquid L from the inside of the liquid container C after molding toward the inside of the blow nozzle 23 is performed after the preform 2 is molded into a liquid container C of a predetermined shape by the blow molding step.

According to this embodiment, in the operating condition setting step, the operating condition of the plunger pump 30 when the suck-back step is performed is set according to the procedures described below.

First, in the preliminary pressurizing step, the plunger pump 30 is operated in the positive direction until the pressure of the liquid L between the plunger pump 30 and the blow nozzle 23 reaches a predetermined pressure with the blow nozzle 23 closed with the sealing body 27 and with both of the opening/closing valves V1 and V2 closed. Further, the operation stroke of the plunger 30b when the pressure of the liquid L between the plunger pump 30 and the blow nozzle 23 reaches a predetermined pressure is compared with the reference stroke, and on the basis of the difference between the operation stroke and the reference stroke, the operation stroke of the plunger 30b toward the reverse direction (sucking direction) when the suck-back step is performed is set. In this case, for example, a stroke amount obtained by multiplying a value by a coefficient α, the value resulting from subtraction of the reference stroke from the operation stroke of the plunger 30b when the pressure of the liquid L between the plunger pump 30 and the blow nozzle 23 reaches a predetermined pressure in the preliminary pressurizing step, is added to the specified operation stroke of the plunger 30b toward the reverse direction when the suck-back step is performed, and this resulting value can be set as the operation stroke of the plunger 30b toward the reverse direction in the next suck-back step. At this time, if the operation stroke of the plunger 30b when the pressure of the liquid L reaches the predetermined pressure is larger than the reference stroke, the operation stroke of the plunger 30b toward the reverse direction in the next suck-back step is larger than the specified operation stroke, and if the operation stroke of the plunger 30b when the pressure of the liquid L reaches the predetermined pressure is smaller than the reference stroke, the operation stroke of the plunger 30b toward the reverse direction in the next suck-back step is smaller than the specified operation stroke. The above described "specified operation stroke" of the plunger 30b toward the reverse direction is an operation stroke that allows an amount of the liquid L contained in the liquid container C after the suck-back step to be within the allowable range with respect to the specified amount when a predetermined amount of liquid is sucked back from the liquid container C after molding by the specified operation stroke after the first blow molding step is performed by the liquid blow molding apparatus 1 in the above described usable state without the operating condition being fine adjusted by the operating condition setting step.

In this manner, in the present disclosure, an amount of air bubbles mixed in the liquid L between the plunger pump 30 and the blow nozzle 23 is estimated by comparing the stroke of the plunger 30b until the pressure of the liquid L between the plunger pump 30 and the blow nozzle 23 obtained in the preliminary pressurizing step reaches a predetermined pressure with the reference stroke, and the operation stroke of the plunger 30b in the suck-back step is fine adjusted according to the amount of air bubbles mixed in the liquid L.

It is to be noted that the above described coefficient $\alpha$ is a coefficient set in accordance with a variety of conditions such as whether an operating condition of the plunger pump 30 is set or not in the blow molding step as described later. The coefficient $\alpha$ may be determined by a preliminary experiment or the like.

Further, when a liquid blow molding is repeatedly performed after the first liquid blow molding, the amount of air bubbles contained in the liquid L between the plunger pump 30 and the blow nozzle 23 increases each time the liquid blow molding is performed, and accordingly the operation stroke of the plunger 30b in the suck-back step is fine adjusted.

In the operating condition setting step, in addition to the above described operating condition of the plunger pump 30 in the suck-back step, the operating condition of the plunger pump 30 in the blow molding step may be set.

In this case, on the basis of the amount of air bubbles mixed in the liquid L estimated from the data acquired in the preliminary pressurizing step, for example, the operating condition of the plunger pump 30 in the blow molding step may be set such that the end position of the plunger 30b controlled by the position control is changed to the position that is farther away from the original position in order to feed a constant amount of liquid L to the preform 2. In greater detail, a stroke amount corresponding to a value obtained by multiplying the difference between the operation stroke of the plunger 30b when the pressure of the liquid L between the plunger pump 30 and the blow nozzle 23 reaches a predetermined pressure in the preliminary pressurizing step and the reference stroke by the coefficient $\beta$ is added to the specified operation stroke of the plunger 30b toward the positive direction when the blow molding step is performed, and this can be set as an operation stroke of the plunger 30b toward the positive direction in the next blow molding step.

It is to be noted that the above described coefficient $\beta$ is a coefficient set according to a variety of conditions when the liquid blow molding is performed. The coefficient $\beta$ may be determined by a preliminary experiment or the like.

In addition to the above described change of the end position of plunger 30b, the operating condition of the plunger pump 30 in the blow molding step can also be set to change a displacing velocity of the plunger 30b according to the amount of air bubbles mixed into the liquid L.

Figure 5:
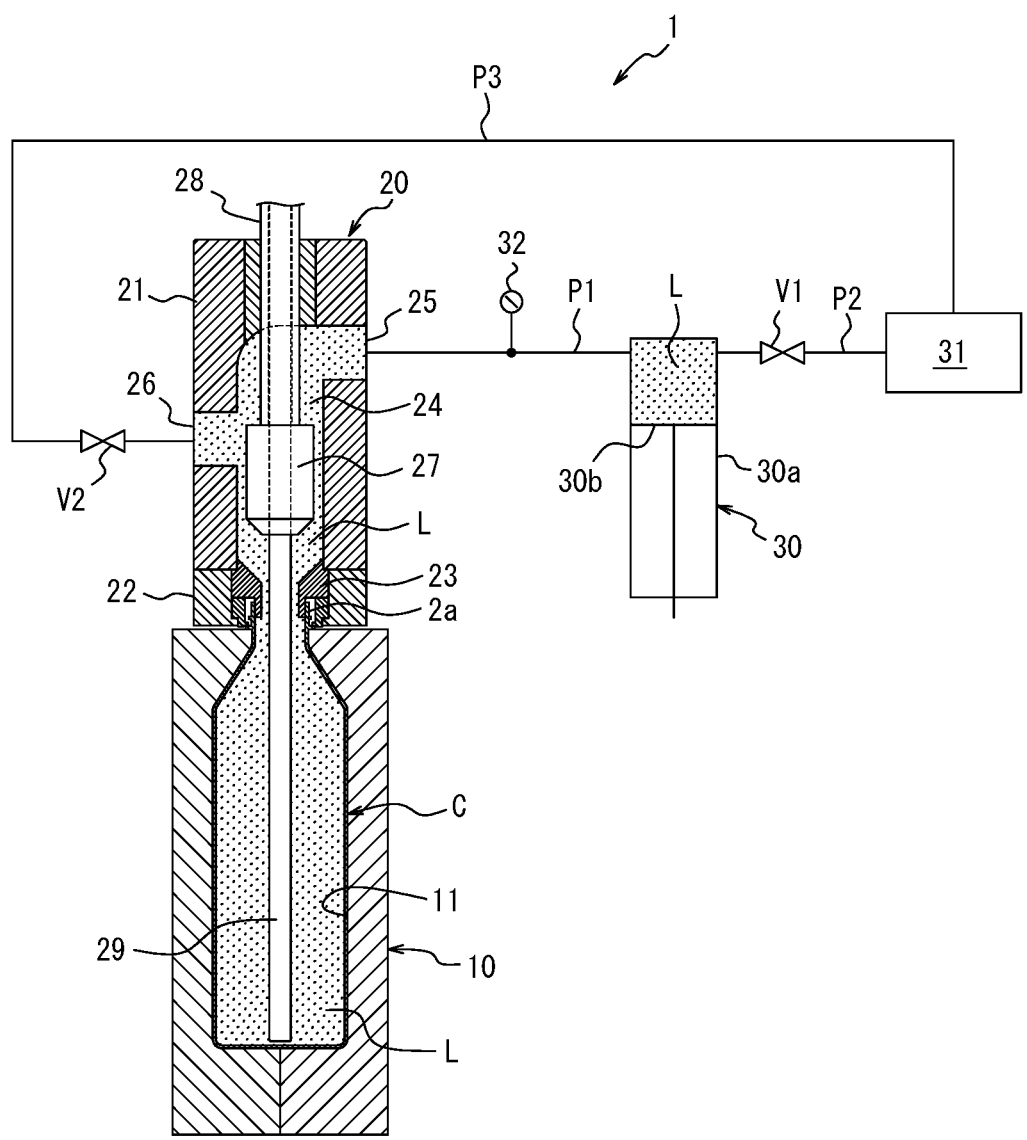
FIG. 5 is a diagram illustrating the liquid blow molding apparatus when a preform is molded into a container in a blow molding step.

When the operating condition setting step is completed, subsequently the blow molding step is performed. In the blow molding step, the plunger pump 30 is operated in the positive direction on the operating condition set in the operating condition setting step with the blow nozzle 23 opened and the opening/closing valves V1 and V2 closed. Thus, the liquid L pressurized to a predetermined pressure is fed from the plunger pump 30 into the preform 2 through the blow nozzle 23, and the preform 2 can be molded (liquid blow molded) into a container of a predetermined shape. In the blow molding step, as illustrated in FIG. 5, the preform 2 is molded into the liquid container C of a predetermined shape conforming to the cavity 11. When the preform 2 is molded into the liquid container C as illustrated in FIG. 5, the blow molding step is completed.

Since the operating condition of the plunger pump 30 in the blow molding step is set by fine adjusting the end position of the plunger 30b according to the amount of air bubbles mixed into the liquid L in the operating condition setting step, the filling pressure of the liquid L (liquid L containing air bubbles) fed into the preform 2 in the blow molding step can be constant regardless of the amount of air bubbles mixed into the liquid L between the plunger pump 30 and the blow nozzle 23. Further, in this case, the displacing velocity of the plunger 30b can be fine adjusted in consideration of a variety of conditions such as molding cycle or the like.

In this manner, in the operating condition setting step, when the operating condition of the plunger pump 30 in the blow molding step is set in addition to the operating condition of the plunger pump 30 in the suck-back step, even if a liquid L such as shampoo or rinse that has a relatively high viscosity and is easy to contain air bubbles is used as a pressurized medium for liquid blow molding, the preform 2 can be reliably molded into a container of a predetermined shape by the liquid L regardless of an amount of air bubbles contained in the liquid L between the plunger pump 30 and the blow nozzle 23. Therefore variation in capacity of the liquid container C after molding can be suppressed. Further, even if a variety of liquids of different viscosities is used (the way the air bubbles come out from the liquids is different depending on the viscosity), the plunger pump 30 is operated on the operating condition according to the amount of air bubbles contained in the liquid L each time the liquid blow molding is performed, and thus the preform 2 can be reliably molded into a container of a predetermined shape.

When the liquid blow molding apparatus 1 is provided with the stretching rod 29, the stretching rod 29 is protruded downward in the blow molding step, and the preform 2 can be axially (longitudinally) stretched by the stretching rod 29. Thus the preform 2 can be subjected to biaxial stretching blow molding in which the preform is biaxially molded by the pressure of the liquid L and the stretching rod 29. By the biaxial stretching blow molding, the preform 2 can be more precisely molded into a liquid container C of a predetermined shape.

Figure 6:
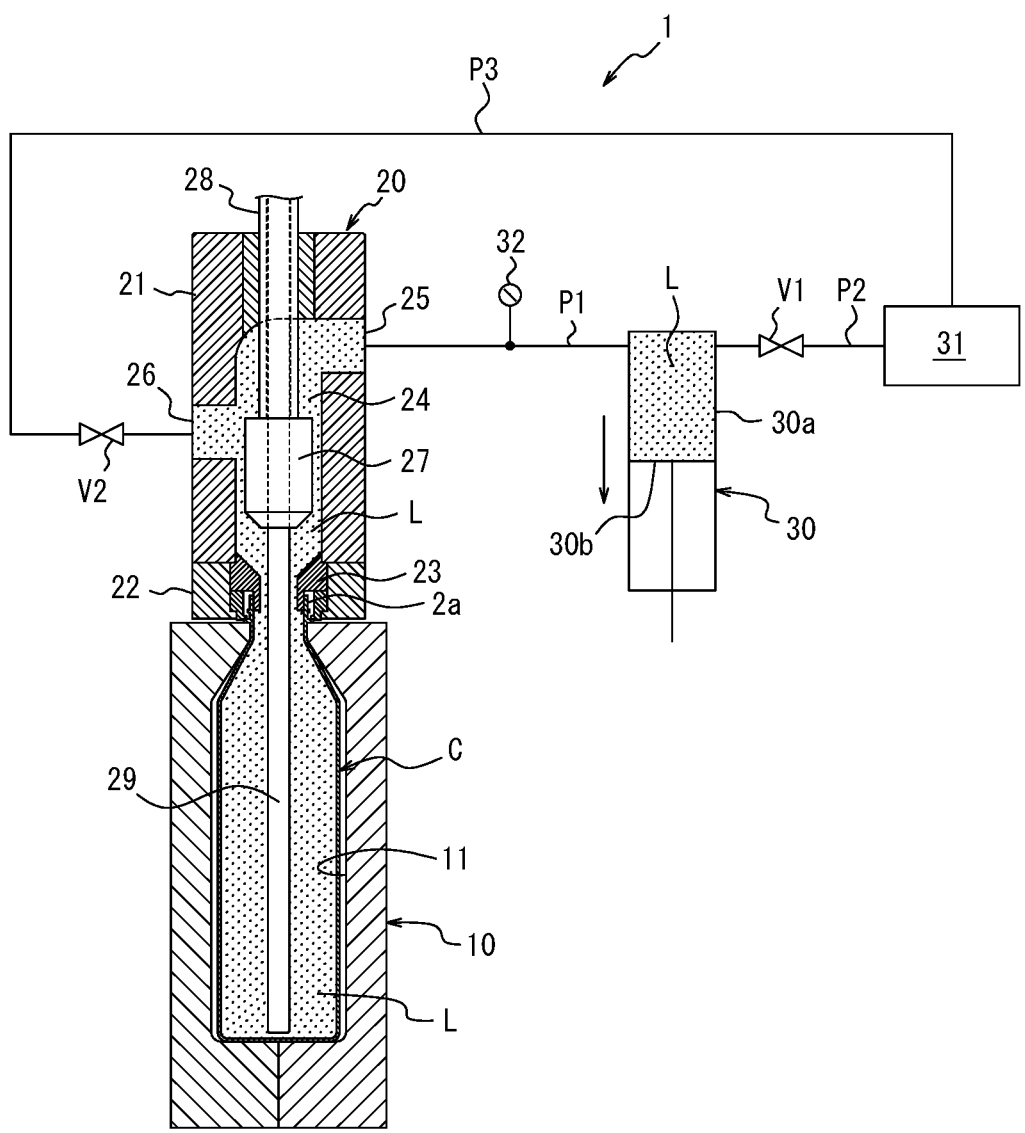
FIG. 6 is a diagram illustrating the liquid blow molding apparatus during a suck-back step.

When the blow molding step is completed, subsequently the suck-back step is performed. In the suck-back step, as illustrated in FIG. 6, the plunger pump 30 is operated in the reverse direction on the operating condition set in the operating condition setting step with the blow nozzle 23 opened and the opening/closing valves V1 and V2 closed. Thus, suck-back is performed in which a set amount of liquid L is sucked back from the inside of the liquid container C molded into a predetermined shape in the blow molding step toward the inside of the blow nozzle 23. When the suck-back step is performed, the content amount of the liquid container C decreases by the amount of the sucked back liquid L, and the container C is deformed while involving a reduction in its capacity and generation of a clearance with the cavity 11, and as a result the pressure in the container C becomes lower than the atmospheric pressure.

In the suck-back step, since the plunger 30b is operated by the operation stroke set in the operating condition setting step, that is, the operation stroke fine adjusted according to the amount of air bubbles mixed into the liquid L, regardless of the amount of air bubbles mixed into the liquid L, only an amount of liquid L, which is set such that the amount of liquid L remaining in the liquid container C after the suck-back step is a specified amount, is sucked back from the liquid container C. Therefore, even if the liquid L that has a relatively high viscosity and is easy to contain air bubbles such as shampoo or rinse is used as a pressurized medium for liquid blow molding, the amount of liquid L remaining in the liquid container C after the suck-back step can be a specified amount regardless of an amount of air bubbles mixed into the liquid L between the plunger pump 30 and the blow nozzle 23. Further, even if the amount of air bubbles contained in the liquid L between the plunger pump 30 and the blow nozzle 23 increases as the blow molding step is repeatedly performed, the operation stroke of the plunger 30b in the suck-back step is fine adjusted each time to the value corresponding to the amount of the air bubbles. Thus the amount of liquid L remaining in the liquid container C after the suck-back step is always a specified amount.

In this manner, in the present disclosure, the operation stroke of the plunger pump 30 in the suck-back step is fine adjusted on the basis of the data acquired in the preliminary pressurizing step. Thus, regardless of the amount of air bubbles contained in the liquid L between the plunger pump 30 and the blow nozzle 23, the liquid L is sucked back from the liquid container C such that the amount of the liquid L remaining in the liquid container C after the suck-back step is a specified amount, and the amount of the liquid L remaining in the liquid container C after the suck-back step can be reliably set as a specified amount.

Figure 7:
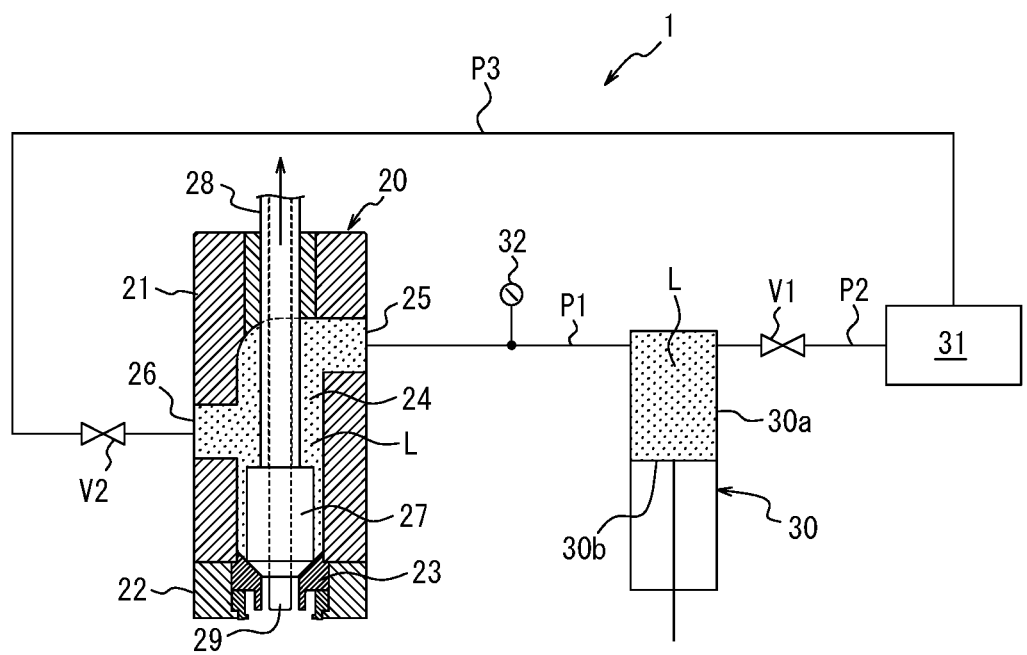
FIG. 7 is a diagram illustrating the liquid blow molding apparatus when the suck-back step is completed.
Figure 7:
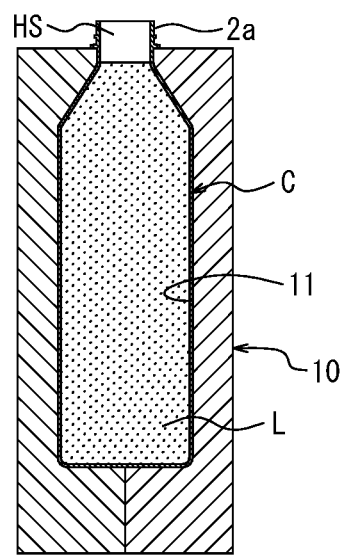

When the set amount of liquid L is sucked back from the liquid container C, the suck-back step is completed, and as illustrated in FIG. 7, the blow nozzle 23 is closed with the sealing body 27 and operation of the plunger pump 30 is stopped. Subsequently the nozzle unit 20 is displaced upward to separate the blow nozzle 23 from the mouth 2a of the liquid container C and the mold 10 is opened so that the liquid container C is ejected from the mold 10. The liquid container C ejected from the mold 10 is illustrated in FIG. 8.

Figure 8:
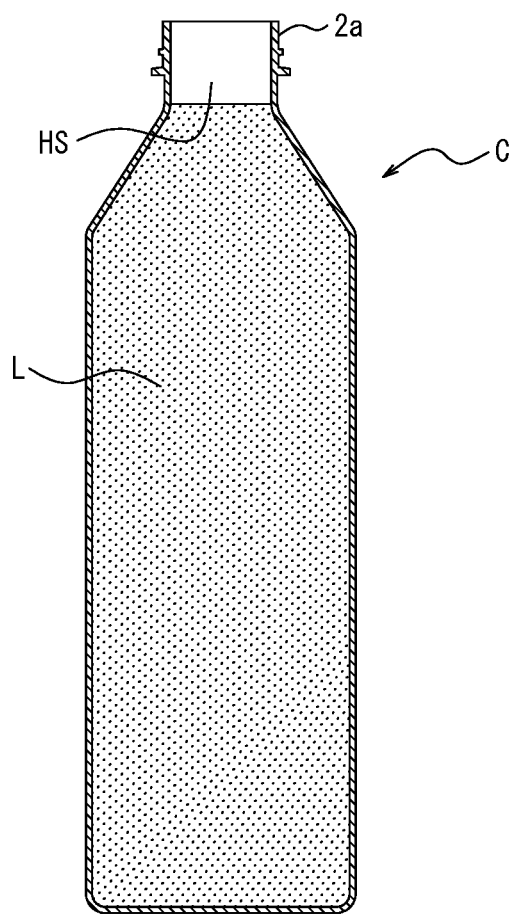
FIG. 8 is a cross-sectional diagram of a liquid container molded by the liquid blow molding method according to an embodiment of the present disclosure.

As illustrated in FIG. 8, the liquid container C ejected from the mold 10 is filled with a specified amount of content liquid L, and a predetermined capacity of space HS containing no liquid L is formed inside of the container C.

When the liquid blow molding apparatus 1 is provided with the stretching rod 29, in addition to suck-back of liquid L in the suck-back step, the capacity of the liquid container C can be decreased by the volume of the stretching rod 29 by pulling the stretching rod 29 out from the liquid container C after molding. Thus a head space HS can be created in the liquid container C. In this case, the amount of liquid L sucked back from the liquid container C in the suck-back step is set in consideration of a decrease in the capacity caused by pulling of the stretching rod 29 out from the liquid container C.

In the blow molding step, it is also possible that the filling pressure of the liquid L fed into the preform 2 is monitored, and the operating condition of the plunger pump 30 is corrected on the basis of the difference between the filling pressure and the reference value. In this case, the operating condition of the plunger pump 30 may be corrected on the basis of the difference between the filling pressure of the liquid L fed into the preform 2 and the reference value of at least one of a pressure rise gradient, a primary peak pressure, a rising point to a secondary peak pressure and a secondary peak pressure.

Figure 9:
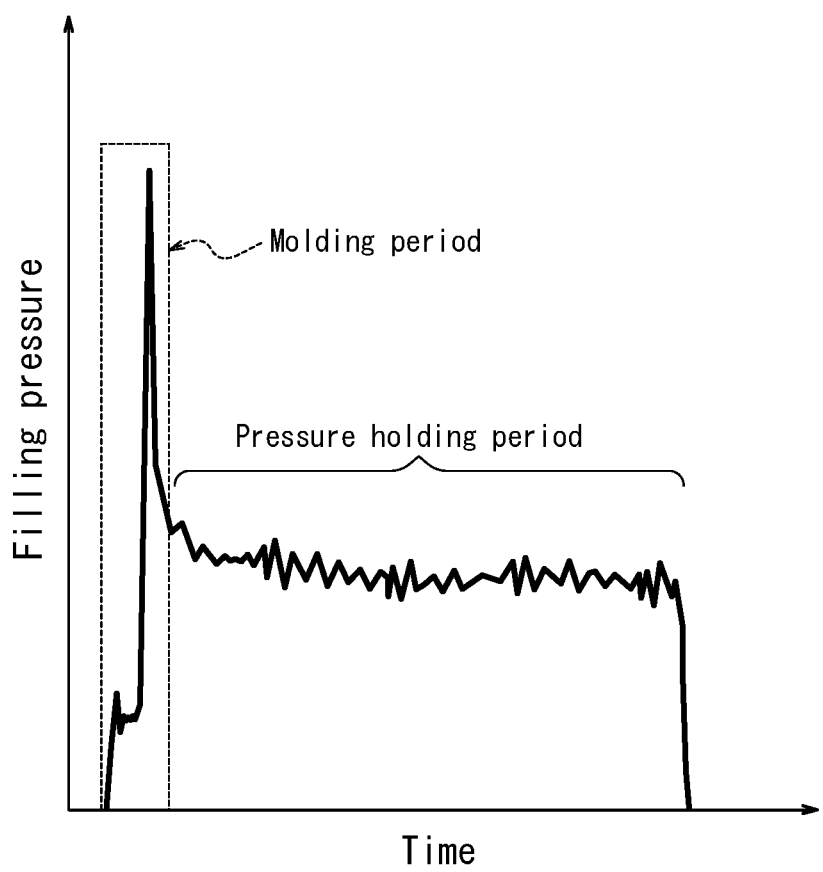
FIG. 9 is a characteristic diagram illustrating a relationship between the filling pressure and the time in a blow molding step.
Figure 10:
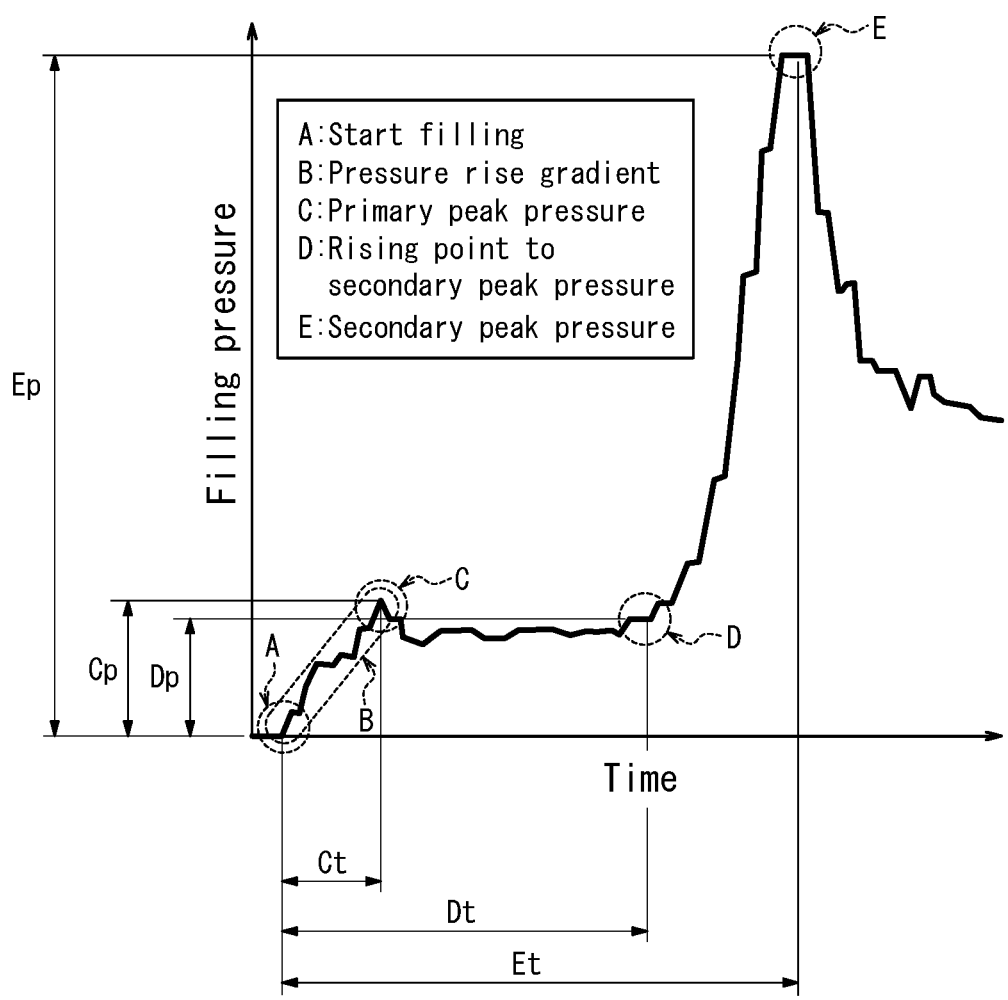
FIG. 10 is a characteristic diagram of an enlarged molding period of FIG. 9.

As illustrated in FIG. 9, in the blow molding step, the filling pressure of the liquid L fed into the preform 2 by operating the plunger pump 30 is set such that it varies in accordance with a process chart including a molding period in which the preform 2 is molded into a shape conforming to the cavity 11 and a holding period in which, after the molding period, a container after molding is held at a predetermined pressure. In the molding process of the process chart, as illustrated in FIG. 10, filling of the liquid L into the preform 2 is started at the point A. The filling pressure rises from the point A with a predetermined pressure rise gradient B, and after a lapse of Ct sec. from the point A, it reaches the primary peak pressure Cp at the pint C. After reaching the primary peak pressure Cp, the filling pressure is substantially constant, and reaches Dp at the point D, which is the point after a lapse of Dt sec. from the point A. From this point the filling pressure starts rising to the secondary peak, and reaches the secondary peak pressure Ep at the point E, which is a point after a lapse of Et sec. from the point A.

In the process chart, with respect to the primary peak pressure Cp at the pressure rise gradient points B and C, the point D, which is a rising point to the secondary peak, and the secondary peak pressure Ep at the point E, reference values are set respectively by experiments or the like in advance. These reference values are values that will be a reference that allows, by the liquid blow molding, the preform 2 to be precisely molded into a container of a predetermined shape and the amount of liquid L filled in a container after molding to be a specified amount.

In the blow molding step, the primary peak pressure Cp at the pressure rise gradient points B and C, the point D, which is a rising point to the secondary peak, and the secondary peak pressure Ep at the point E of the filling pressure of the liquid L fed into the preform 2 are monitored, and when these values are different from the reference values, respectively, the operating condition of the plunger pump 30 is corrected by the feedback control such that the difference is eliminated. Thus, the filling process of liquid L in the blow molding step is optimized, which allows the preform 2 to be more precisely molded into a container of a predetermined shape.

Although the operating condition of the plunger pump 30 can be corrected on the basis of at least one of the primary peak pressure Cp at the pressure rise gradient points B and C, the point D, which is a rising point to the secondary peak, and the secondary peak pressure Ep at the point E of the filling pressure of the liquid L, it can also be corrected on the basis of any or all of the primary peak pressure Cp at the pressure rise gradient points B and C, the point D, which is a rising point to the secondary peak, and the secondary peak pressure Ep at the point E of the filling pressure of the liquid L. Further, the operating condition of the plunger pump 30 may be corrected on the basis of points or portions of the filling pressure of the liquid L fed into the preform 2 in the process chart except for those described above. For example, the operating condition of the plunger pump 30 may be corrected also on the basis of the filling pressure of the liquid L in the pressure holding period of FIG. 9. Further, the operating condition of the plunger pump 30 in the suck-back step may be corrected on the basis of at least one of the primary peak pressure Cp at the pressure rise gradient points B and C, the point D, which is a rising point to the secondary peak, and the secondary peak pressure Ep at the point E of the filling pressure of the liquid L fed into the preform 2 in the blow molding step.

Needless to say, the present disclosure is not limited to the above described embodiment, and may be modified in various manners without departing from the gist thereof.

For example, in the above embodiment, although the disclosed liquid blow molding method is performed by using the liquid blow molding apparatus 1 configured as illustrated in FIG. 1, the disclosed liquid blow molding method may be performed by using a liquid blow molding apparatus of other configurations.

Further, in the above embodiment, although the plunger pump 30 is used as a pressure feeding source, a device other than the plunger pump 30 may be used as a pressure feeding source as far as it can pressurize the liquid L and feed it to the preform 2.

Moreover, in the above embodiment, although in the operating condition setting step, the operating condition of the plunger pump 30 is set on the basis of the difference between the stroke of the plunger 30b until the pressure of the liquid L between the plunger pump 30 and the blow nozzle 23 reaches a predetermined pressure in the preliminary pressurizing step and the reference stroke, the operation stroke of the plunger 30b in the suck-back step may be set on the basis of the change in the pressure of the liquid L between the plunger pump 30 and the blow nozzle 23 caused when the plunger 30b is displaced by a predetermined stroke in the preliminary pressurizing step.

Furthermore, in the above embodiment, although the operating condition setting step of setting the operation stroke of the plunger 30b in the suck-back step is performed before the blow molding step, it is not limited thereto, and the operating condition setting step may be performed after the blow molding step and before the suck-back step.

Moreover, according to the above embodiment, in the operating condition setting step, the operating condition of the plunger pump 30 in the blow molding step is also set in addition to the operating condition of the plunger pump 30 in the suck-back step. However, the operating condition of the plunger pump 30 in the blow molding step may not be set.

REFERENCE SIGNS LIST

1 Liquid blow molding apparatus
2 Preform
2a Mouth
2b Barrel
10 Mold
11 Cavity
20 Nozzle unit
21 Body block
22 Support block
23 Blow nozzle
24 Feed path
25 Feed port
26 Flange
27 Sealing body
28 Shaft body
29 Stretching rod
30 Opening
30a Cylinder
30b Plunger
31 Feed tank
32 Pressure gauge
L Liquid (content liquid)
P1 Connection path
V1 Opening/closing valve
P2 Connection path
P3 Connection path
V2 Opening/closing valve
C Liquid container
HS Head space

The invention claimed is:

1. A liquid blow molding method of feeding a pressurized liquid from a pressure feeding source into a bottomed tubular preform through a blow nozzle to mold the preform into a liquid container of a predetermined shape containing a content liquid, the method comprising:
a preliminary pressurizing step of operating the pressure feeding source with the blow nozzle closed with a sealing body to preliminary pressurize a liquid between the pressure feeding source and the blow nozzle;
an operating condition setting step of setting an operating condition of the pressure feeding source on the basis of data acquired by the preliminary pressurizing step;
a blow molding step of operating the pressure feeding source with the blow nozzle opened to liquid blow mold the preform into a container of a predetermined shape; and
a suck-back step of operating the pressure feeding source in a reverse direction with the blow nozzle opened on the operating condition set in the operating condition setting step to suck back a liquid from inside of the container molded into a predetermined shape in the blow molding step toward inside of the blow nozzle.

2. The liquid blow molding method according to claim 1, wherein, in the blow molding step, the pressure feeding source is operated by the operating condition set in the operating condition setting step to liquid blow mold the preform into a container of a predetermined shape.

3. The liquid blow molding method according to claim 2, wherein, the pressure feeding source is a plunger pump comprising a cylinder and a plunger axially displaceable in the cylinder; and the operating condition of the pressure feeding source set in the operating condition setting step is an operation stroke of the plunger.

4. The liquid blow molding method according to claim 3, wherein, in the operating condition setting step, the operating condition of the pressure feeding source is set on the basis of a difference between a stroke of the plunger until a pressure of the liquid between the plunger pump and the blow nozzle in the preliminary pressurizing step reaches a predetermined pressure and a reference stroke.

5. The liquid blow molding method according to claim 1, wherein, the pressure feeding source is a plunger pump comprising a cylinder and a plunger axially displaceable in the cylinder; and the operating condition of the pressure feeding source set in the operating condition setting step is an operation stroke of the plunger.

6. The liquid blow molding method according to claim 5, wherein, in the operating condition setting step, the operating condition of the pressure feeding source is set on the basis of a difference between a stroke of the plunger until a pressure of the liquid between the plunger pump and the blow nozzle in the preliminary pressurizing step reaches a predetermined pressure and a reference stroke.

* * * * *